Sept. 11, 1923.
J. R. OISHEI
1,467,809
TIGHTENING DEVICE FOR DEMOUNTABLE WHEEL RIMS
Filed Sept. 3, 1919
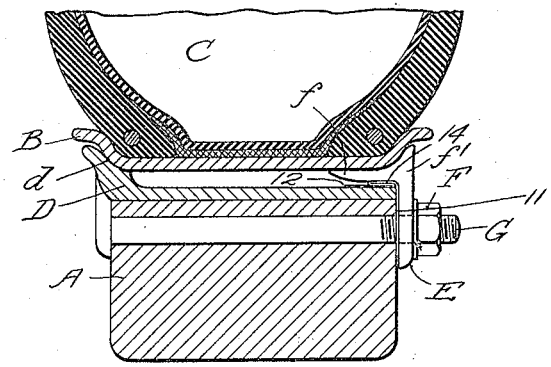
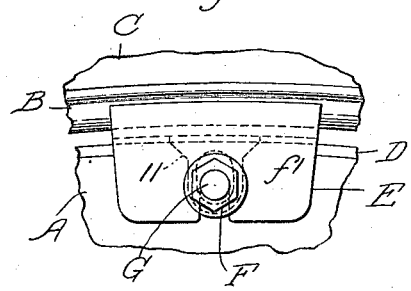
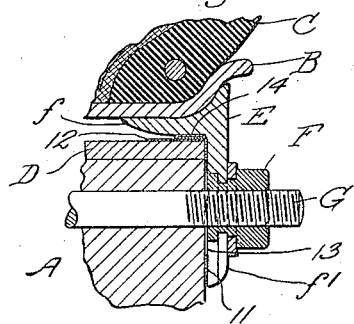
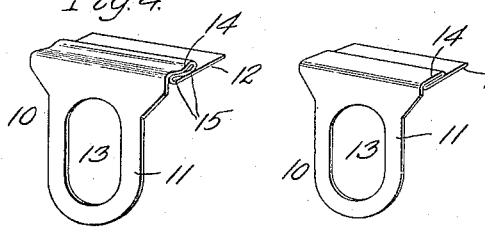
INVENTOR.
John R. Oishei
by Parker & Prochnow.
ATTORNEYS.

Patented Sept. 11, 1923.

1,467,809

UNITED STATES PATENT OFFICE.

JOHN R. OISHEI, OF BUFFALO, NEW YORK, ASSIGNOR TO TRI-CONTINENTAL CORPORATION, OF BUFFALO, NEW YORK.

TIGHTENING DEVICE FOR DEMOUNTABLE WHEEL RIMS.

Application filed September 3, 1919. Serial No. 321,347.

*To all whom it may concern:*

Be it known that I, JOHN R. OISHEI, a citizen of the United States, residing at Buffalo, in the county of Erie and State of New York, have invented a new and useful Improvement in Tightening Devices for Demountable Wheel Rims, of which the following is a specification.

This invention relates to rim-tightening means for use with automobile or vehicle wheel rims of the demountable type, in which a rim with a pneumatic or other tire in place thereon is removably secured on the wheel by devices which permit the ready removal and replacement of the rim with its tire. In some of the makes of demountable rims which are in use at the present time, the demountable rim rests at one side or edge thereof on a seat on a fixed metal band on the wheel felly, and is forced over firmly onto the seat and secured on the wheel by screw-operated wedges or locking devices which are forced to a seat between the opposite edge or side of the demountable rim and the adjacent portion of the felly band. If these locking devices or wedges, when forced in to the limit of their movement, do not fit tight enough to hold the rim absolutely rigid, an objectionable squeak or noise results, due to the movement of the rim or locking devices.

Furthermore, movement or play of the rim causes wear on the lugs or parts intended to prevent the rim from creeping around the wheel, thus destroying their effectiveness and resulting in the shearing of the valve stem of the tire.

One object of this invention is to provide a practical, desirable and inexpensive tightening device, for use with the securing devices of demountable rims, which will take up all play between the securing devices and the rim or wheel so as to prevent any possible play of the rim or securing devices; and which is constructed so that the device will automatically adjust or adapt itself to different conditions and take up more or less play as required when tightening the securing devices, without requiring any manipulation or change in form of the tightening device itself. Another object is to make the tightening device of a form such that it is adapted to take up considerable play or space between the securing device and the wheel or rim and to be collapsed or compressed more or less by the tightening of the securing devices so as to accommodate itself to different conditions in which there may be greater or less play or space between the securing device and the wheel or rim.

In the accompanying drawings:

Fig. 1 is a fragmentary transverse section of a wheel felly and tire provided with a tightening device for the demountable rim embodying the invention.

Fig. 2 is a fragmentary side elevation thereof.

Fig. 3 is an enlarged section of the securing and tightening devices and associated parts.

Fig. 4 is a perspective view of one of the tightening devices detached showing the original condition of the same.

Fig. 5 is a similar view showing the folds of the tightener compressed.

A represents the felly of a wheel and B a demountable rim therefor equipped with a pneumatic tire C. The demountable rim shown bears at one side of the wheel on a seat $d$ on a fixed, metal band D on the wheel felly, and the rim B is fastened in place on the wheel by a plurality of securing or wedge devices E which are located at intervals around the opposite side of the wheel and, when secured in place, form seats for the adjacent side or edge of the demountable rim. These securing devices or wedges are forced into and held in securing position by nuts F screwed onto bolts G extending through the wheel felly. Each of the securing devices has a lateral wedge portion $f$ which extends between the wheel felly and rim B, and a shank portion $f'$ which extends radially at the side of the felly and has an opening through which the end of the bolt G projects. These parts are of known construction and they may be of the construction shown in the drawings or of any other usual or suitable construction in which the demountable rim is secured in place on the wheel by wedges or analogous securing devices which are movable into holding relation to the wheel and the demountable rim.

10 represents the rim-tightening or shim device. This preferably consists of a single piece of sheet metal or thin metal bent to provide a shank or securing portion 11, which is adapted to extend inwardly at one side of the wheel felly, and a lateral flange or tightening portion 12 which is adapted to extend transversely of the wheel between the felly and the rim B. The tightening device is intended to be placed, as shown in Figs. 1 and 3, between the securing device E and the wheel felly, and the shank 11 is provided with a suitable slot or opening 13 adapting it to be slipped over the projecting end of the bolt G. The tightening flange or portion 12 thus extends laterally between the outer face of the felly band D and the wedge portion of the securing device E so as to take up any space or play between the felly band and the securing device and cause the latter to wedge or seat firmly between the wheel and demountable rim. The flange portion of the tightening device is folded upon itself, as shown at 14 in the drawings, so that while the inner or extreme edge of the flange is of a single thickness of metal, the outer portion thereof, or portion nearest to the outer side of the wheel, is thicker and comprises a plurality of thicknesses, preferably three thicknesses of the metal. The tightening devices can be inexpensively made in this form in suitable stamping or forming machines, and in making the devices the folds 14 of the flange are preferably not crushed or compressed flat against each other, but are formed so as to leave spaces 15 in the corners of the folds between the overlying, folded portions. The folded portion is thus thicker at its edges or corners than it would be if the corners of the folds were compressed or closed tightly together, and the folded edges are adapted to be compressed and the folds forced flat against each other by the pressure of the wedge or securing device E thereon when forcing the wedge or securing device into holding position between the rim and the wheel. Therefore, if there is considerable space between the securing device and the felly band, the tightening device is adapted to occupy and fill this space and thus prevent looseness or play of the wedge or securing device. Nevertheless, if there is less space between the wedge or securing device and felly band, the wedge or securing device, when it is forced home to its seat against the demountable rim, will compress or flatten out the folds of the flange. The folded flange is thus adapted to collapse or compress more or less under the pressure of the securing device E and automatically adapt itself to the space without any separate manipulation or change in form of the tightening device. The folded or thickened portion of the flange is located at the outer edge of the wheel directly beneath the thickest part of the wedge E where it will be most effective in producing the tightening action.

I claim as my invention:

1. The combination with a wheel felly, a demountable rim and a plurality of securing devices which extend between said felly and rim for securing the rim on the wheel, of a plurality of metal tightening devices adapted to cooperate with said securing devices and each having a shank and a flange extending at an angle from said shank, said flange being adapted to extend transversely of the wheel felly and having a plurality of folded superimposed layers of metal having points of contact with one another and having open spaces at the corners of the folds to enable the folds to be compressed in the use of the device, whereby the tightening device is automatically adapted to the space to be filled between the felly and the securing device with which it cooperates.

2. A tightening device for demountable wheel rims, comprising a single piece of thin metal having a shank adapted to extend radially of the felly of the wheel, an integral, angularly projecting flange adapted to extend transversely of said felly and to seat beneath a rim securing lug thereon, said flange being folded upon itself to form an inner portion of a single thickness adapted to rest on said felly beneath the inner end of said lug, and an outer portion of a plurality of thicknesses adjacent to said shank and adapted to rest beneath the outer portion of said lug on said felly.

3. A tightening device for demountable wheel rims, consisting of a single piece of thin metal having a shank and a flange extending at an angle to each other and adapted to extend respectively radially and transversely of a wheel felly, said flange being folded upon itself between its free end and said shank to form a thin end edge and a thicker folded portion between said end edge and said shank, spaces being left between said folds to adapt the folds to be compressed under pressure in the use of the device.

Witness my hand this 29th day of August, 1919.

JOHN R. OISHEI.

Witnesses:
M. J. PITMAN,
F. E. PROEHNOW.